US008842361B1

United States Patent
Manzur

(10) Patent No.: US 8,842,361 B1
(45) Date of Patent: Sep. 23, 2014

(54) MODE-LOCKED LASER WITH FREE-SPACE OPTICAL FEEDBACK

(71) Applicant: Tariq Manzur, Lincoln, RI (US)

(72) Inventor: Tariq Manzur, Lincoln, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/224,358

(22) Filed: Mar. 25, 2014

(51) Int. Cl.
*H01S 3/098* (2006.01)

(52) U.S. Cl.
USPC .............................. 359/340; 372/18

(58) Field of Classification Search
USPC .............................. 359/340; 372/18
See application file for complete search history.

(56) References Cited

U.S. PATENT DOCUMENTS

| | | | | |
|---|---|---|---|---|
| 6,717,719 | B1* | 4/2004 | Moore | 359/340 |
| 7,346,083 | B2* | 3/2008 | Hsu et al. | 372/20 |
| 2002/0163941 | A1* | 11/2002 | Hsu et al. | 372/18 |
| 2008/0310465 | A1* | 12/2008 | Achtenhagen | 372/22 |
| 2013/0156051 | A1* | 6/2013 | Peccianti et al. | 372/18 |

* cited by examiner

*Primary Examiner* — Mark Hellner
(74) *Attorney, Agent, or Firm* — James M. Kasischke; Michael P. Stanley

(57) ABSTRACT

A mode-locked laser amplifier utilizing free-space optical feedback is provided. The amplifier may tap a portion of the input laser signal and tap a portion of the output laser signal, combine the input and output samples in a free-space coupler to form a feedback laser signal, and couple the feedback laser signal back to the input laser signal. The free-space coupler suppresses higher order modes of the output laser signal. The free-space coupler can be tunable to permit selection of the operating mode of the amplifier. A plurality of amplifiers can be utilized to form a multi-stage mode-locked amplifier system. The composite feedback signal can be coupled back to each amplifier stage to lock the operating mode.

7 Claims, 3 Drawing Sheets

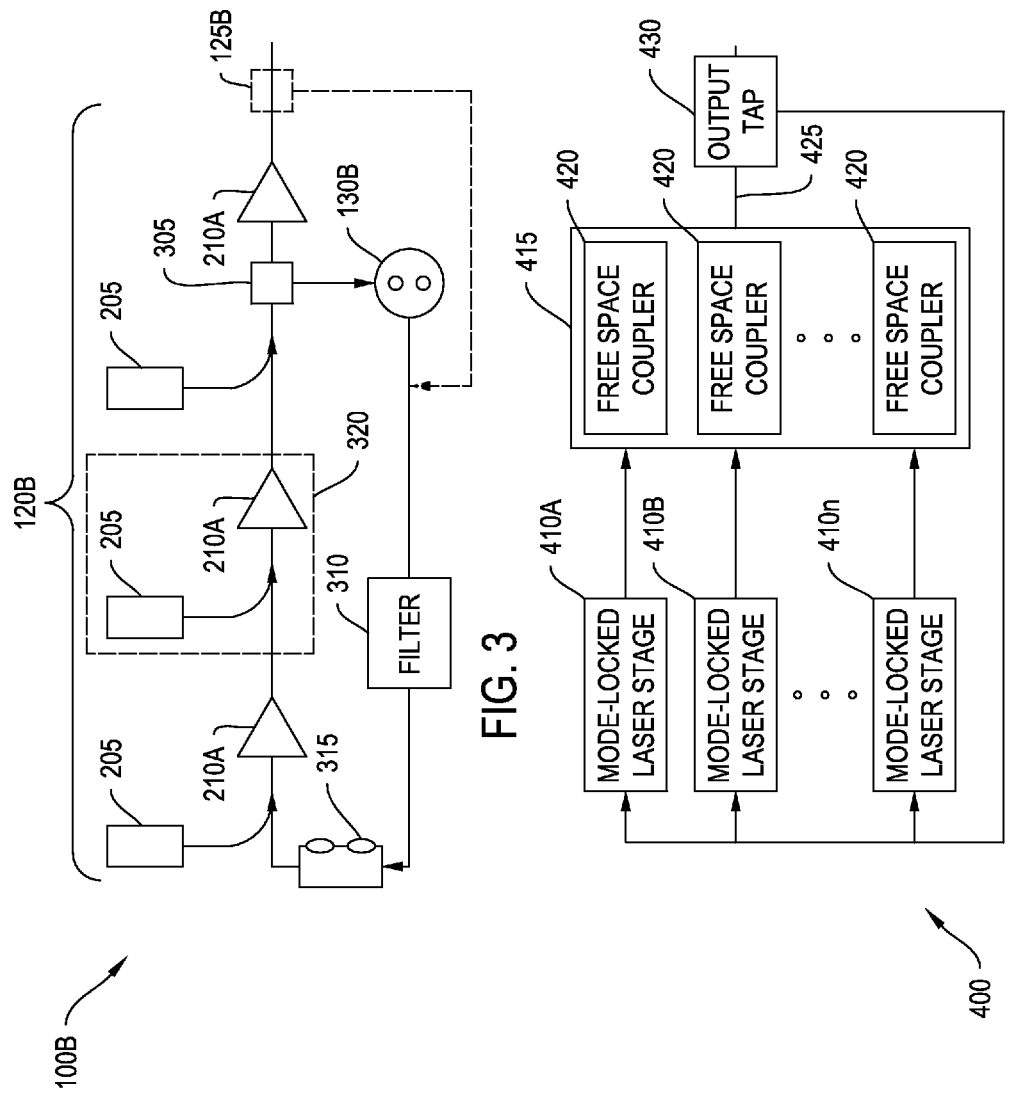

MODE-LOCKED LASER WITH FREE-SPACE OPTICAL FEEDBACK

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to optical laser systems and, in particular, to mode-locked laser systems having free-space feedback couplers.

(2) Description of the Prior Art

High average and high peak power lasers such as diode or fiber lasers with good beam quality are attractive sources for applications including high energy lasers for use in directed energy systems, industrial laser machining, and numerous scientific applications. For scaling the output power of the fiber based laser systems (e.g., to hundreds of kilowatts), as is required for directed energy applications, some method to provide optical amplification is required.

In fiber amplifiers, the gain medium is a glass fiber that can be doped with rare earth ions such as erbium, neodymium, ytterbium, praseodymium, or thulium. The active dopant is pumped by an optical source, such as a fiber-coupled diode laser, where the pump light propagates through the fiber core along with the signal being amplified.

Raman amplifiers, unlike that described in the present invention, are based on Raman gain resulting from stimulated Raman scattering (SRS). In fiber Raman amplifiers, where the nonlinear active medium is typically an optical fiber, the maximum gain is obtained for a frequency offset between pump and signal depending on the composition of the fiber core. Fibers used for Raman amplifiers are not doped with rare earth ions. Any typical single mode fiber can practically be used. Compared to rare earth (e.g., erbium) doped fiber amplifiers, Raman amplifiers have the following advantages and disadvantages. The SRS amplification process can be readily cascaded, thus accessing a variety of wavelength regions if suitable pump sources are available. In addition, the gain spectrum can be tailored by using different pump wavelengths simultaneously. Raman fiber amplifiers require a longer length of fiber but can have a lower noise figures. Lastly, if the pump wavelength is polarized, the Raman gain will be polarization dependent, which is often an unwanted effect.

Beam combination can be utilized for scaling laser output power. This, however, generally requires single frequency operation for each of the stages. Wavelength beam combining (WBC), however, can be an incoherent process where the brightness scales proportionally to the total number of laser input elements. The output beam of a WBC system is that of a single multi-wavelength beam, where the output power scales the power from each of the input laser elements.

WBC allows for brightness scaling of a diode laser array because all of the laser elements are spatially overlapped at the output coupler, maintaining the output beam quality (low $M^2$ value) of a single element while scaling the output power by the number of elements in the array. WBC can be applied to any laser with a gain bandwidth, including fiber lasers.

A primary limitation for scaling single-frequency fiber lasers and amplifiers to higher power and higher energy is due to stimulated Brillouin scattering (SBS). SBS results from nonlinear optical effects in the fiber. It primarily occurs when narrowband optical signals are amplified in a fiber amplifier. This leads to vibrations in the optical medium that cause scattering. Thus, there is a need for an improved diode or fiber laser that can be used at high power and high energy levels.

SUMMARY OF THE INVENTION

Accordingly, it is an object of the present invention to provide a mode-locked laser amplifier that utilizes a free-space coupler to filter higher order modes and locks in a fundamental operating mode of the laser amplifier.

According to a first illustrative example, a method of providing free-space optical feedback in a mode-locked laser system is provided. The method may include tapping a sample of an input laser signal at a first input tap. The remaining portion of the input laser signal is fed into a series of amplifier stages. A sample of an amplified laser signal is tapped from the output of a final amplifier stage of the series of amplifier stages. The input sample is combined with the input and the output samples in a free-space coupler to generate a feedback laser signal. The feedback laser signal is added to the input laser signal at the first input tap.

Certain aspects may provide for suppressing and filtering higher order mode wavelengths of the output sample in the free-space coupler to lock a fundamental mode of the mode-locked laser system. The free-space coupler can be tunable and, as such, the method includes selecting an operating wavelength of the free-space coupler to determine an output wavelength of the amplified laser signal from the mode-locked laser system. In some examples, the free-space coupler includes an integrated nonlinear ring resonator configured to lock in an output wavelength of the amplified laser signal from the mode-locked laser system.

Additional aspects can provide for the free-space coupler to include one or more of a free-space optical diffraction grating or a free-space optical reflector. Combining the feedback laser signal and the input laser signal can include using a filter-driven four-wave mixer. The free-space coupler can include an integrated nonlinear resonator glass band configured to provide nonlinearity, gain, and tunability for the feedback laser signal.

Furthermore, each stage of the series of amplifier stages can include a pump laser and a fiber amplifier. The input laser signal can be provided by a diode laser or a fiber ring amplifier. Additionally, the method can include combining a plurality of free-space couplers from different mode-locked laser systems in a module array to provide amplified output signals from each of the mode-locked laser systems. The amplified output signals from each of the mode-locked laser systems can be combined using a wavelength beam combiner.

According to a second illustrative example, a mode-locked laser system is provided. The system includes a seed laser providing an input laser signal. An input tap collects a sample of the input laser signal. A plurality of amplifier stages are configured in series to receive the input laser signal at a first amplifier stage and provide an amplified laser signal from a final amplifier stage. An output tap collects a sample of the amplified laser signal. A free-space coupler is in optical communication with the input tap and the output tap. The free-space coupler can be configured to combine the input and the output samples to provide a feedback laser signal and to couple the feedback laser signal to the input laser signal at the input tap.

The free-space coupler can be tunable such that wavelength of the feedback laser signal can be selected. According to certain aspects, the free-space coupler can include an integrated nonlinear ring resonator. Additionally or alternatively, the free-space coupler can include one or more of a free-space optical diffraction grating or a free-space optical reflector. According to certain aspects, each of the plurality of amplifier stages can include a pump laser and a fiber ring amplifier.

According to third illustrative example, a multi-stage mode-locked laser system is provided. The system includes a plurality of mode-locked laser stages. Each stage can include, a series of amplifier stages being fed an input laser signal into a first stage and providing an amplified laser signal out from a final stage, an input tap collecting a sample from the input laser signal, and an output tap collecting a sample of the amplified laser signals; and a module array comprising a plurality of free-space couplers, each coupler associated with a mode-locked laser stage and being configured to receive the input and the output samples from the associated stage, the module array configured to combine the input and output samples from each free-space coupler to provide a composite feedback laser signal.

According to certain aspects, the composite feedback laser signal is combined with the input laser signal at the input tap from each stage to lock an operating mode wavelength of the multi-stage mode-locked laser system. The free-space couplers can be tunable such that an operating mode wavelength of the multi-stage mode-locked laser system can be selected. The system may further include a wavelength beam combiner receiving the amplified laser signals from each stage to provide a combined laser output signal from the multi-stage mode-locked laser system.

Other objects and advantages of the present invention will be apparent to those having ordinary skill in the art reading the instant specification, drawings, and appended claims.

BRIEF DESCRIPTION OF THE DRAWINGS

A further understanding of the nature and advantages of the present invention can be realized by reference to the following drawings. In the appended figures, similar components or features may have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

FIG. 3 is a diagram of yet another example mode-locked system including components configured according to various embodiments of the invention;

FIG. 4 is a block diagram of an example multi-stage mode-locked system including components configured according to various embodiments of the invention.

DETAILED DESCRIPTION OF THE INVENTION

Methods, systems, and devices are disclosed for free-space optical feedback in a mode-locked laser system. An input sample from a seed laser source can be combined with an output sample from the output of a series of amplifier stages. The input and output samples are combined in a free-space coupler to form a feedback laser signal. The feedback laser signal can be injected back in to the input laser signal to be fed through the amplifier stages. Combining the input and output samples and injecting the feedback laser signal locks an operating mode (e.g., wavelength) of the laser system. Further, the free-space coupler can be tunable, to a degree disclosed herein, such that the operating mode of the laser system can be user selectable.

According to various embodiments, multiple mode-locked laser systems are utilized where their individual outputs are combined in a wavelength beam combiner to generate a composite laser output signal having an amplitude that can be a function of the number of laser systems. Input and output samples from each laser system can be combined in a module array that can include a free-space coupler associated with each laser system to generate a feedback laser signal. Each of the feedback laser signals can be combined in the module array to form a composite feedback laser signal. The composite feedback laser signal can be provided to each laser system as the feedback laser signal. Accordingly, the operating mode of the multi-stage mode-locked laser system can be locked to a fundamental operating mode. Further, the operating mode of the module array can be tunable such that the operating mode of the multi-stage mode-locked laser system can be selected.

This description provides examples, and is not intended to limit the scope, applicability or configuration of the invention. Rather, the ensuing description will provide those skilled in the art with an enabling description for implementing embodiments of the invention. Various changes can be made in the function and arrangement of elements.

Thus, various embodiments may omit, substitute, or add various procedures or components as appropriate. For instance, it should be appreciated that the methods can be performed in an order different than that described, and that various steps can be added, omitted or combined. Also, aspects and elements described with respect to certain embodiments can be combined in various other embodiments. It should also be appreciated that the following systems, methods, devices, and software may individually or collectively be components of a larger system, wherein other procedures may take precedence over or otherwise modify their application.

Figure 1:
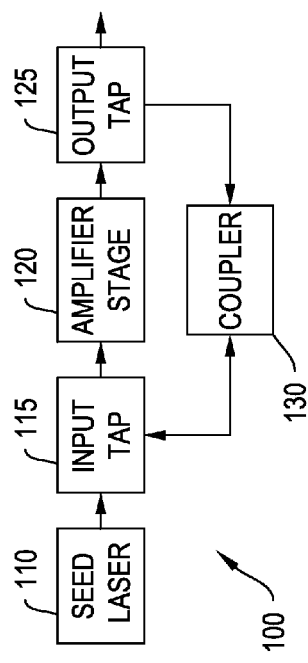
FIG. 1 is a block diagram of an example mode-locked system including components configured according to various embodiments of the invention.

Referring now to the drawings, and more particularly to FIG. 1, shown therein is a block diagram of an exemplary mode-locked system 100 according to embodiments of the present disclosure. The system 100 includes a seed laser 110, an input tap 115, an amplifier 120, an output tap 125, and a coupler 130.

The seed laser 110 can be configured to generate or otherwise provide an input laser signal. The seed laser 110 can be one or more of a diode laser and/or a ring seed laser. The seed laser 110 can be a ring seed laser including a Ytterbium (Yb) doped fiber ring. According to some embodiments, the seed laser 110 can be a seed amplifier that receives and/or amplifies a laser signal being received from outside the system 100.

As one example, where multiple systems 100 are utilized to provide a multi-stage mode-locked laser system, a common laser signal can be fed to each of the seed lasers 110 for each stage. According to some embodiments, the seed laser 110 can be configured to provide a broadband laser signal. The seed laser 110 can be adjustable such that an operating mode (e.g., wavelength) of the input laser signal can be selected.

The input tap 115 can be configured to receive the input laser signal from the seed laser 110. The input tap 115 may also be configured to retain or tap at least a portion of the input laser signal and feed the remaining portion of the input laser signal as an input to the amplifier 120. The input tap 115 can be configured to retain or tap one or more of multiple predetermined amounts of the input laser signal (e.g., 5%, 10%, 15%, etc.). According to certain embodiments, the input tap 115 can be configured to provide the tapped sample from the input laser signal to the coupler 130 and receive a feedback laser signal from the coupler 130. Coupler 130 is a free space optical coupler that receives the input sample from input tap 115 and the output sample from output tap 125. The input sample and output sample have the same phase and are combined and provided to input tap 115 as a coupler output signal. In input tap 115, the coupler output signal is combined with the remaining portion of the input laser signal and provided to amplifier stage 120.

The amplifier 120 may include one, two, three, or some other predetermined number of amplifier stages. In one embodiment, the amplifier 120 may include no more than three individual amplifier stages. Each stage can be configured to amplify a laser signal. Accordingly, a first amplifier stage can be in optical communication with the seed laser 110 to receive the remaining portion (i.e., the portion not tapped) of the input laser signal. The first amplifier stage may amplify the remaining portion of the input laser signal and feed the amplified portion to a second amplifier stage, and so on for each additional amplifier stage. As can be appreciated, a final amplifier stage may output an amplified laser.

The amplifier 120 is mode locked to the input laser signal. In this case, the input laser signal from tap 115 is a combination of the input seed laser signal and the tapped output laser signal. The modified laser signal is used as input signal for the amplifier.

According to some examples, each of the amplifier stages may include a pump laser and a fiber amplifier. Each pump laser may output and feed an additional laser signal into the laser signal being amplified. The pump laser frequency (or mode) can match that of the input laser signal. Exemplary wavelengths can include, but are not limited to, 790/800/940/980 nm, or some other wavelength. The pump laser may feed the pump laser signal into the laser signal being amplified in a bidirectional or unidirectional manner.

The output tap 125 can be configured to receive the amplified laser signal from the final stage of the amplifier stages 120 and retain or tap at least a portion of the amplified output laser signal and provide the output sample to the coupler 130. The output tap 125 may tap a predetermined percentage of the output laser signal e.g., 1%, 5%, 10%, and the like. The output tap 125 can be further configured to provide the remaining portion (i.e., the portion not tapped) as an amplified output laser signal.

The coupler 130 can be configured to receive and combine the input sample from the input tap 115 and the output sample from the output tap 125. The combined samples can be fed back to the input tap 115 as a feedback laser signal that is combined or otherwise coupled with the remaining portion of the input laser signal and fed into the amplifier stage 120. The coupler 130 can be configured to act as a filter to suppress higher order modes or supermodes and lock the fundamental mode, enhancing the gain and stability of the system 100. The combined signal represents a uniform signal that is less subject to variations than a single signal. Combination with the input tap results in greater influence from the seed laser frequency.

The coupler 130 can be tunable according to some embodiments. As such, the user may select an operating mode or wavelength of the system 100 by tuning the coupler 130. According to some examples, the coupler 130 may include one or more of a nonlinear ring resonator, a free space optical diffraction grating, and/or a free space optical reflector. According to other examples, the coupler 130 may include a nonlinear resonator glass band that is configured to provide nonlinearity, gain, and/or tunability for the coupler 130.

In a typical laser system, it can be appreciated that individual amplifier stages may not realize perfect linearity. Accordingly a laser signal, as it passes through each amplifier stage, may experience band-shift, power gain/loss, and the like resulting in variations in the final amplified output laser signal. Further, environmental conditions may additionally impact the gain and/or bandpass of each amplifier stage, e.g., temperature variations. Accordingly, the linewidth of the amplified laser signal may broaden as it passes through the amplifier stages due to such nonlinearity effects as well as other parameters of the amplifier stages e.g., physical parameters of the fiber. Ideally, this linewidth should be controlled. It can be appreciated that utilization of the presently disclosed mode locked laser system 100, including the free-space optical coupler 130, can address such instability issues. That is, the presently disclosed free-space feedback technique effectively locks the fundamental mode of the system 100 and ensures stable, high power output.

Figure 2:
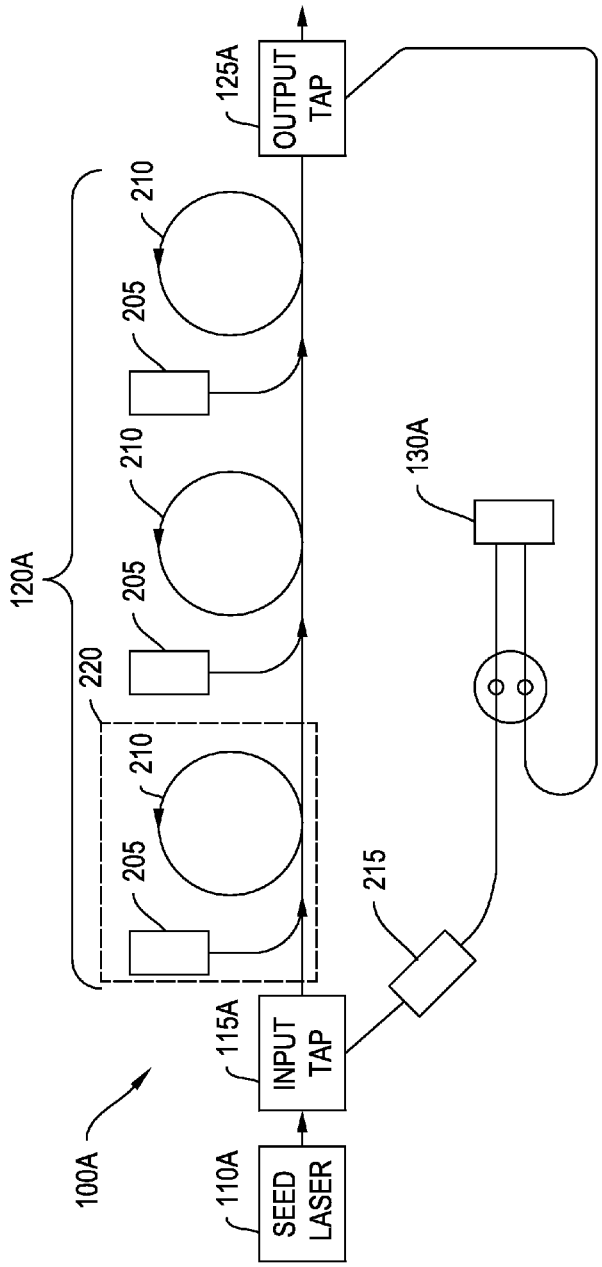
FIG. 2 is a diagram of another example mode-locked system including components configured according to various embodiments of the invention.

FIG. 2 is a diagram of a mode-locked laser system 100A according to various embodiments of the present disclosure. The laser system 100A may implement aspects and/or components of the mode-locked laser system 100 of FIG. 1. Generally, the laser system 100A illustrates an exemplary embodiment where each amplifier stage includes a pump laser and a fiber ring laser amplifier.

The laser system 100A includes a seed laser 110A, an input tap 115A, a plurality of amplifier stages 220 (three being shown by way of example), an output tap 125A, and a free-space coupler 130A. Each amplifier stage 220 can include a pump laser 205 and an amplifier fiber 210.

Generally, the seed laser 110A is configured to generate or otherwise provide an input laser signal to the input tap 115A. The input tap 115A can be configured to receive the input laser signal and tap at least a portion (e.g., 10%) of the input laser signal and provide the remaining portion to the first stage of amplifier stages 220. The first pump laser 205 provides a laser input signal that can be combined or otherwise coupled with the remaining portion of the input laser signal. The fiber ring laser amplifier 210 can be configured to amplify the laser signal. As can be appreciated, each of the amplifier stages 120A provides amplification to the laser signal such that an amplified output laser signal can be provided to the output tap 125A.

The output tap 125A can be configured to tap at least a portion of the output laser signal and provide the output sample to the free-space coupler 130A. The output tap 125A can be further configured to provide the remaining portion of the amplified output laser signal as an output signal of the laser system 100A.

The free space coupler 130A is configured to receive and combine the input sample and the output sample to generate a feedback laser signal. The feedback laser signal can be fed into the input tap 115A to be combined with the input laser signal, the combined signals are provided to the first amplifier stage 220. As previously discussed a saturable absorber 215 can be included in the laser system 100A. Saturable absorber 215 allows accumulation of the coupler output 130A until a threshold is met. When the threshold is reached, saturable absorber will allow transmission of the coupled light back into amplifier 220. The coupled light comes out at a resonance frequency between 215 and 130A.

FIG. 3 is a diagram of a mode-locked laser system 100B according to various embodiments of the present disclosure. The laser system 100B may implement aspects and/or components of the mode-locked laser systems 100 of FIG. 1 and/or 100A of FIG. 2. Generally, the laser system 100B can be a variation of the system 100 wherein, rather than utilizing a seed laser, the feedback laser signal can be fed directly into a first amplifier stage. Thus, the first amplifier stage can be designated a seed amplifier. The laser system 100B further illustrates an exemplary embodiment which includes an additional tap 305 after the second fiber amplifier stage which feeds back a signal with less broad linewidth than the tap after the third fiber amplifier stage. This variation can provide an additional manner of wavelength correction.

The mode-locked laser system 100B may include a plurality of amplifier stages 320 (three being shown by way of example), each amplifier stage 320 including a pump laser 205 and a fiber or seed amplifier 210A, an intermediary tap 305, an output tap 125B, a free space optical coupler 130B, a filter 310, and a power management control 315.

Generally, the amplifier stages 320, including the pump laser 205 and the amplifier 210A are configured to receive and amplify a laser signal at each stage. The output of the second amplifier stage 320 can be fed into the intermediary tap 305 where at least a portion of the laser signal can be tapped and provided to the free space optical coupler 130B. According to some examples, an amplified output laser signal can be fed in to the output tap 125B where at least a portion of the amplified output laser signal is optionally tapped and fed into the optical coupler 130B. The output signal from the optical coupler 130B can be provided to a power management controller 315 through the filter 310. Filter 310 is a bandpass filter for reducing signals, such as undesired modes, outside a passband. As indicated by the arrows, the feedback laser signal can be fed back to the power management control 315 in a unidirectional manner. Generally, the power management controller 315 can be configured to receive the feedback laser signal and regulate (e.g., amplify, limit, etc.) the feedback laser signal and provide the feedback laser signal as an input to the first amplifier stage 320.

As discussed above, typical amplifier stages 320 are not necessarily linear in the gain and/or bandpass functionality. As indicated by the exemplary waveforms shown in FIG. 3, the variation including the intermediary tap 305 provides an output from the final stage of the amplifier stages 320 that has a regulated and controlled bandwidth.

FIG. 4 is a block diagram 400 of an exemplary multi-stage mode-locked system 400 including components configured according to various embodiments of the invention. The laser system 400 may implement aspects and/or components of the mode-locked laser systems 100, 100A and 100B of FIGS. 1-3. The multi-stage mode-locked laser system 400 may include a plurality of mode-locked laser stages 410 (as indicated by reference numerals 410A to 410n, where n represents the number of stages) as well as a module array 415. Each of the mode-locked laser stages 410 can be implemented using the laser systems 100, 100A and 100B of FIGS. 1-3.

Accordingly, the output of each mode-locked laser stage 410 can generally be a mode-locked laser signal having the features described above.

The module array 415 includes a plurality of free-space couplers 420 (as indicated by reference numerals 420A to 420n, where n represents the number of free-space couplers 420. The free-space couplers 420 implement components or aspects of the free space couplers 130 of FIGS. 1-3. Generally, each free-space coupler 420 can be associated with a mode-locked laser stage 410 and can be configured to receive the input and output samples from the associated stage. The module array 415 can be configured to combine the input and output samples from each free-space coupler 420 to provide a composite feedback laser signal 425. The composite feedback laser signal can be provided as a feedback laser signal from output tap 430 to each of the mode-locked laser stages 410. Accordingly, the composite feedback laser signal locks an operating mode wavelength of the multistage mode locked laser system 400.

According to some examples, the free-space couplers 420 can be tunable such that the operating mode wavelength of the multi-stage mode-locked laser system 400 can be user selected. That is, a user can select an operating mode wavelength by tuning one or more of the free-space couplers 420 to the desired wavelength. According to further examples, the multi-stage mode locked laser system 400 includes a wavelength beam combiner 430 that receives the amplified laser signals from each of the mode-locked laser stages 410 and combines the signals to form a combined laser output signal.

The combined laser output signal, which benefits from the individual amplifier stages 410 may obtain a power greater than the power obtainable from the individual stages. Further, the number of mode-locked laser stages 420 can be dependent or otherwise selected based on the total output power desired for the multi-stage mode-locked laser system 400.

Figure 5:
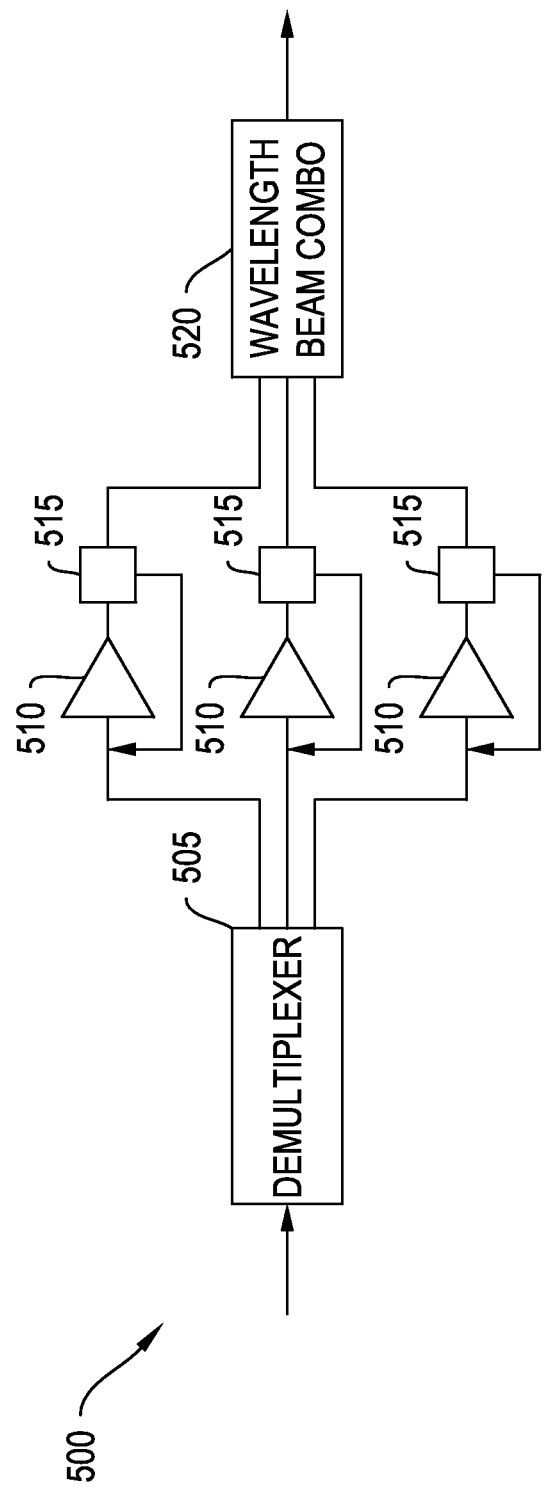
FIG. 5 is a diagram of another example multi-stage mode-locked system including components configured according to various embodiments of the invention.

FIG. 5 is a diagram of another multi-stage mode-locked system 500 according to various embodiments of the present invention. The laser system 500 can implement aspects and/or components of the mode-locked laser systems 100, 100A and 100B of FIGS. 1-3 and/or the multi-stage mode-locked laser system 400 of FIG. 4. Generally, the multi-stage mode-locked laser system 500 illustrates an example including a plurality of fiber amplifier stages configured in parallel, each stage producing an output consisting of different wavelength ranges that are combined utilizing a wavelength beam combiner into a single high intensity output. According to some embodiments, the multi-stage mode-locked system 400 can be suited for high-power applications such as laser welding.

The multistage mode locked laser system 405-*a* may include a demultiplexer 505, a plurality of amplifier stages 510 (three being shown by way of example) having feedback from taps 515, and a wavelength beam combiner 520. The input laser signal can be received from a seed laser, an earlier amplifier stage, and the like. The demultiplexer 505 can be configured to receive an input laser signal having several separate frequencies. Demultiplexer 505 can provide separate frequency ranges to each amplifier 510. Each amplifier 510 can be tuned to a specific frequency range.

Each amplifier stage 510 may include a feedback signal from tap 515 in accordance with aspects of the present disclosure. That is, each of the amplifier stages 510 may implement aspects of the mode-locked laser systems 100, 100A and 100B of FIGS. 1-3. In accordance with some examples, each amplifier stage 510 may include a single amplifier stage having a feedback signal that can be tapped at 515 from an output of the amplifier stage 510 and then combined with the input laser signal. The combined signal can be fed in to the input of the amplifier stage 510. The output from each of the amplifier stages 510 can be fed in to the wavelength beam combiner 520 to be combined to form a composite output laser signal. Accordingly, the composite output laser signal may realize an amplitude greater than the amplitude of each of the output signals from the amplifier stages 510.

Other aspects may provide for the wavelength beam combiner 520 to lock the operating mode of the multi-stage multimode laser system 500. The wavelength beam combiner 520 can be configured to receive the output from each amplifier stage 510 and combine the outputs to form the composite output laser signal having a mode-locked frequency.

A method of providing free-space optical feedback in a mode-locked laser system is taught according to various embodiments of the present disclosure. Aspects of the method can be performed by one or more of the mode-locked laser systems 100, 100A and 100B of FIGS. 1-3 and/or the multi-stage mode-locked laser systems 400 and 500 of FIGS. 4-5.

A sample of an input laser signal can be tapped at an input tap. The remaining portion of the input laser signal can be fed into a series of amplifier stages. According to certain examples, there can be three amplifier stages wherein each stage includes a pump laser and a fiber ring laser amplifier. A sample of the amplified laser signal from the output of a final amplifier stage can be tapped at an output tap. The output tap may tap a predetermined portion of the amplified laser signal (e.g., 1%, 5%, 10%, etc.). The remaining portion of the amplified output laser signal can be provided as an output signal of the multi-mode laser system. The input and output samples are combined in a free-space coupler to generate a feedback laser signal. The feedback laser signal can be added to the input laser signal at the input tap. As can be appreciated, the combined signal including the input laser signal and the feedback laser signal can be fed in to the first stage of the series of amplifier stages. The free-space coupler may suppress higher order modes to provide a mode-locked output laser signal.

Turning now to additional aspects of the present disclosure, provided is a mode-locked laser using a diode or fiber seed laser with tap and incorporating multiple Ytterbium (Yb) doped fiber based amplifiers with external free-space feedback in a master oscillator power amplifier (MOPA) architecture. A portion (e.g., 10%) of the seed laser input signal is tapped, while the remaining portion comprises the input to a series of fiber amplifiers. A portion of the amplified output signal from the fiber amplifiers is then retained and transmitted through free-space, coupled with the tapped signal using and optical diffraction grating or output coupler, and then fed back into the tapped channel to the diode or fiber laser using an isolator to ensure unidirectional optical transmission. This free-space feedback technique effectively locks the fundamental mode and ensures stable, high power output.

A free-space optical feedback coupler (FSOBC) can act as the filter to suppress the higher order mode or supermode and enhance the gain in the fundamental mode of the fiber laser ring laser/multimode diode laser. A mode-locked fiber ring laser/multimode diode laser can include an integrated nonlinear resonator glass band integrated with the FSOBC that combines nonlinearity and gain and provides wavelength tunability. A tunable mode-locked fiber ring laser can incorporate a filter driven four-wave mixing (FD-FWM) technique in some ways similar to disruptive four-wave mixing schemes. With this technique, the filter can be inserted into the fiber laser cavity to suppress unwanted modes allowing the generation of extremely stable output, whereas dissipative FWM laser varies after the supermode from what is known as supermode instability.

A mode-locked fiber ring laser/multimode diode laser can be provided where the tunability of the seed laser is provided by user wavelength ($\lambda 1$-$\lambda 25$) selection of the laser output (2-5 kW range), a portion of which comprises the feedback signal to the seed laser. These wavelengths are combined using a wavelength beam combining technique by way of the output coupler or optical grating to provide the full bandwidth (~20 GHz) without stimulated Brillouin scattering (SBS) and preserving high beam quality (low M2). The total laser output power can be enabled to be on the order of 100 kW.

Certain aspect provide for enough length of fiber in the ring fiber laser to allow sufficient gain for the fundamental modes and nonlinearly to sustain lasing, but condensed enough so as to not allow closely spaced longitudinal modes to form within the bandpass of the filter. Such modes can interfere with each other, creating low frequency noise that causes unstable operation. According to some examples, expected total fiber length of the ring fiber laser can be on the order of a couple of meters.

A mode-locked fiber ring laser/multimode diode laser can provide linewidths ranging from a few gigahertz (GHz) to tens of GHz, depending on the required output power as well as chosen physical parameters of the fiber.

According to a final aspect of the disclosure, the mode-locked laser with free-space feedback can include a diode or ring fiber seed laser providing the input seed signal. Additional lasers emitting at 790/800/940/980 nm or other wavelength comprises the pump sources. The pump to the fiber amplifier can be uni- or bi-directional. The seed laser input can be tapped (e.g., 1-10%), and the remaining light (90-99%) can be fed into a series of (up to three, for example) Yb-doped or Nd-YAG or ER or Thulium fiber based amplifiers as identified number of sequential stages. The substantially amplified (kW range) output from the last stage or any intermediate stage of the fiber amplifiers can then be transmitted over free-space or fiber coupled to the next high power amplifier stage and a portion of it coupled into the fiber from the tapped input. An isolator ensures unidirectional optical propagation, and the output signal provides a free space optical feedback from the output coupler, that comprises the gratings or reflectors into the taped fiber from the input seed diode or ring fiber laser. This effectively locks in the fundamental mode, enhancing the stability of the system.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:
1. A mode-locked laser system comprising:
   a seed laser capable of providing an input laser signal;
   an input tap joined to said seed laser capable of collecting a portion and transmitting a remainder of the input laser signal;
   a plurality of amplifier stages configured in series and joined to said input tap to receive the remainder of the input laser signal at a first amplifier stage and provide an amplified laser signal from a final amplifier stage;

an output tap joined to the final amplifier stage capable of collecting a portion and transmitting a remainder of the amplified laser signal, the transmitted remainder being providable as mode-locked laser output; and a free-space coupler in optical communication with said input tap and said output tap, said free-space coupler configured to combine the input tap collected portion and the output tap collected portion into a feedback laser signal, said free-space coupler being joined to said input tap to couple the feedback laser signal to the remainder of the input laser signal at the input tap.

2. The system of claim 1 wherein at least one of said plurality of amplifier stages comprises:

a doped fiber optic loop joined to receive the laser signal and to provide an amplified laser signal; and a pump laser joined to provide a pump laser signal to said doped fiber optic loop.

3. The system of claim 1 wherein at least one of said plurality of amplifier stages comprises a semiconductor optical amplifier joined to receive the laser signal and to provide an amplified laser signal.

4. A mode locked laser system comprising:

a plurality of amplifier stages, each capable of providing an amplified laser signal;

a free-space coupler joined to each of said plurality of amplifier stages for receiving the amplified laser signal and capable of combining the amplified laser signals into a combined laser signal;

an output tap joined to the free-space coupler for receiving the combined laser signals, said output tap being capable of collecting a portion and transmitting a remainder of the amplified laser signal, the transmitted remainder being providable as mode-locked laser output; and said plurality of amplifier stages being capable of receiving the collected portion of the amplified laser signal and mode locking to the amplified laser signal.

5. The system of claim 4 wherein at least one of said plurality of amplifier stages comprises:

a doped fiber optic loop joined to receive the laser signal and to provide an amplified laser signal; and a pump laser joined to provide a pump laser signal to said doped fiber optic loop.

6. The system of claim 4 wherein at least one of said plurality of amplifier stages comprises a semiconductor optical amplifier joined to receive the laser signal and to provide an amplified laser signal.

7. A mode-locked laser system comprising:

a demultiplexer having an input for receiving a multi-frequency laser signal and having outputs for providing single frequency laser signals;

at least one laser amplifier having an input joined to one output of said demultiplexer and capable of providing an amplified single frequency laser signal;

at least one output tap joined to each said at least one laser amplifier, capable of receiving the amplified single frequency laser signal, said output tap collecting a portion and transmitting a remainder of the amplified single frequency laser signal, the collected portion being provided to the at least one laser amplifier input and the transmitted remainder being providable as mode-locked laser amplifier output; and a wavelength beam combiner joined to each said at least one output tap capable of receiving the mode-locked laser amplifier output, said wavelength beam combiner having an output capable of providing combined mode-locked laser amplifier outputs from each laser amplifier output tap combination.

* * * * *